(12) United States Patent
Deng et al.

(10) Patent No.: US 7,134,858 B2
(45) Date of Patent: Nov. 14, 2006

(54) SYSTEM FOR HOT PRESSING CELLULOSIC AND LIGNOCELLULOSIC MATS

(75) Inventors: Xixian (James) Deng, Sainte Foy (CA); Yongqun Xie, Fuzhou (CN)

(73) Assignee: Forintek Canada Corp. (CA)

( * ) Notice: Subject to any disclaimer, the term of this patent is extended or adjusted under 35 U.S.C. 154(b) by 449 days.

(21) Appl. No.: 10/786,884

(22) Filed: Feb. 25, 2004

(65) Prior Publication Data

US 2004/0224044 A1 Nov. 11, 2004

Related U.S. Application Data

(63) Continuation-in-part of application No. 10/429,722, filed on May 6, 2003, now Pat. No. 6,740,272.

(51) Int. Cl.
*B29C 43/02* (2006.01)
(52) U.S. Cl. .............. 425/81.1; 425/144; 425/170; 425/421; 425/456; 425/407
(58) Field of Classification Search .............. 425/135, 425/143, 144, 169, 170, 80.1–83.1, 407, 425/421, 432, 456; 264/109–128
See application file for complete search history.

(56) References Cited

U.S. PATENT DOCUMENTS 4,140,744 A 2/1979 Karas et al.
4,743,187 A * 5/1988 Schermutzki .............. 425/83.1
5,720,835 A 2/1998 Lingart et al.

FOREIGN PATENT DOCUMENTS

CA 2 380 651 2/2001

OTHER PUBLICATIONS

Vinogradov, V.A., "Analysis of Energy Parameters During the Vibrational Pressing Process", Mezhvuz Sb., Nauch. Tr., Tekhnol. Oborud. Derevoobrabat Proizv. (Kulikov, V.A., et al., ed.): 56-59 (1987 Leningrad).

* cited by examiner

*Primary Examiner*—Yogendra N. Gupta
*Assistant Examiner*—Thu Khanh T. Nguyen
(74) *Attorney, Agent, or Firm*—Weide & Miller, Ltd.

(57) ABSTRACT

A system for pressing lignocellulosic and/or cellulosic materials to produce composite products such as medium density fiberboard subjects a mat of material to alternating or vibratory forces applied to a face surface of the mat. The frequency of the alternating forces may be between 0.2 Hz and 2 Hz. This vibratory pressing action causes heat to be transferred more quickly to the core of the mat from the surface, and reduces the pressing time required for thermosetting resins within the mat to cure. The system comprises a press for accepting the mat; a sensor for sensing a parameter indicative of heat in the core of the mat; and a control system for controlling the application of vibratory and non-vibratory forces to the mat.

25 Claims, 1 Drawing Sheet

SYSTEM FOR HOT PRESSING CELLULOSIC AND LIGNOCELLULOSIC MATS

RELATED APPLICATIONS

This application is a continuation-in-part of U.S. patent application Ser. No. 10/429,722 filed 6 May 2003 now U.S. Pat. No. 6,740,272 and claims the benefit of the filing date thereof.

TECHNICAL FIELD

The present invention relates to pressing of materials to form pressed sheets of material, and more particularly to methods and systems for pressing lignocellulosic materials to produce composite wood products such as medium density fiberboard, oriented strand board and particle board.

BACKGROUND

There are many types of composite wood products formed from lignocellulosic material. Some examples include medium density fiberboard ("MDF"), oriented strand board ("OSB"), and particleboard. Others include laminated veneer lumber ("LVL"), laminated structural lumber (known in the art as "Glulam") and plywood. These composite products are generally made by adhering together wood materials such as lumber, veneers, strands, flakes, particles, and fibers with adhesives. Thermosetting adhesives are commonly used, which include phenol-formaldehyde (PF) resins, phenol-resorcinol-formaldehyde (PRF) resins, resorcinol-formaldehyde (RF) resins, urea formaldehyde (UF) resins, melamine urea formaldehyde (MUF) resin and isocyanate (MDI) resin.

Such composite wood products are typically produced by adding the adhesive to the lignocellulosic material and forming a mat of the combination. The mat is heated to a temperature range within which the rate of curing of the adhesive is significant, and is pressed for a period of time, allowing the resin to cure completely, or nearly completely. This process is well known in the art as "hot pressing". The range of temperature within which the rate of curing of adhesive is significant is referred to throughout this document as the "curing temperature range". Those skilled in the art of thermosetting adhesives will appreciate that some adhesive curing may occur below the curing temperature range, but that the rate of curing increases dramatically when the adhesive reaches its curing temperature range. The curing temperature range is different for different types of adhesives and may also depend on other factors, such as the type of cellulosic material in the mat, the moisture content of the mat and the vapour pressure within the mat.

For best hot pressing results, it is desirable for the resins within the mat to reach the curing temperature range in order to cure properly. Preferably, the entire volume of the mat will reach the curing temperature range to allow all of the resin in the mat to cure. When heat is applied to the mat in a typical hot pressing operation, however, it is only applied to one or both face surfaces of the mat. In a typical system, the conveyor belt on which the mat rides is heated and supplies heat directly to a surface of the mat. The heat is expected to be conducted from the surface of the mat to the core of the mat. Since wood is not a good conductor of heat, however, this conduction of heat inwardly from the surface of the mat is an inefficient way of heating the core of the mat, and while the resin near the surface of the mat may reach the curing temperature range relatively quickly, it takes much longer for the core of the mat to reach the curing temperature range.

It is desirable to attempt to heat the core of the mat more quickly to save time and production cost in the manufacture of composite wood products. Attempts have been made in the past to add more heat to pressing systems by way of steam injection, and also by way of subjecting the mat to microwave and radio frequency radiation. These techniques are not desirable, however, because they require great amounts of energy, and, especially in the case of radiation, require significant protective mechanisms which are cost-prohibitive.

Accordingly, there is a desire for a system for heating and pressing a mat of lignocellulosic material which permits shorter pressing times.

SUMMARY OF INVENTION

A first aspect of the present invention provides a system for heating and pressing a mat of material having at least one face surface and comprising a thermosetting adhesive. The system comprises a press for accepting the mat; at least one sensor for sensing a parameter indicative of heat within a core of the mat; and a control system connected to accept a signal from the sensor. The control system is configured to cause the press to apply vibratory forces to the face surface when the signal indicates that the parameter is below a predetermined reference level and to cause the press to apply a non-vibratory force to the face surface when the parameter is above the predetermined reference level.

Another aspect of the present invention provides a system for heating and pressing a mat of material having at least one face surface and comprising a thermosetting adhesive. The system comprises a press for accepting the mat; at least one sensor for sensing a parameter indicative of heat within a core of the mat; and a control system connected to accept a signal from the sensor. The control system is configured to cause the press to apply vibratory forces to the face surface when the signal indicates that the parameter has reached a first predetermined reference level and to cause the press to apply a non-vibratory force to the face surface when the parameter has reached a second predetermined reference level.

Yet another aspect of the invention provides a system for pressing a mat of material having at least one face surface and comprising a thermosetting adhesive. The system comprises a press for accepting the mat; at least one temperature sensor for sensing the temperature of the core of the mat; and a control system for accepting a signal from the temperature sensor. In response to the signal, the control system causes the press to apply vibratory forces to the face surface when the temperature of the core of the mat is below a predetermined temperature. The control system is also programmed to cause the press to apply a non-vibratory force to the face surface when the temperature of the core of the mat is above the predetermined temperature.

Still another aspect of the invention provides a system for heating and pressing a mat of material having at least one face surface and comprising a thermosetting adhesive. The system comprises a press for accepting the mat; at least one temperature sensor for sensing a temperature of the core of the mat; at least one vapour pressure sensor for sensing a vapour pressure within a core of the mat; and a control system for accepting signals from the temperature sensor and the vapour pressure sensor. The control system is configured to cause the press to apply vibratory forces to the face surface when the signal from the vapour pressure sensor indicates that the vapour pressure within the core of the mat has reached a predetermined vapour pressure level and to cause the press to apply a non-vibratory force to the face surface when the signal from the temperature sensor indicates that the temperature of the core of the mat has reached a predetermined temperature level.

The parameter indicative of heat within a core of the mat may comprise a temperature of the core of the mat, a vapour pressure within the core of the mat, ultrasonic emissions from the mat and/or radiation emission from the mat.

The system may comprise a pressing face for applying the vibratory and non-vibratory forces to the mat. The pressing face may apply the vibratory and non-vibratory forces to the mat in a direction that is normal to the face surface. The pressing face may provide heat to the mat by conduction from the pressing face.

The system may comprise a conveyor for transporting the mat and for providing heat to the mat by conduction from the conveyor. The system may also comprise a source of steam for providing heat to the mat.

The vibratory forces may have a frequency in a range of 0.2–2.0 Hz. The vibratory forces may be applied by reciprocatably moving the pressing face over a distance in a range of 0.2–3.0 mm.

The predetermined temperature, predetermined vapour pressure and/or predetermined reference level(s) may correspond with a temperature that is below a curing temperature range of the adhesive. The onset of the curing temperature range may be approximately 60–110° C.

Prior to being accepted on the press, the temperature of the mat is preferably below a curing temperature range of the adhesive.

Another aspect of the invention provides a system for pressing a mat of material having at least one face surface and comprising a thermosetting adhesive. The system comprises a press for accepting the mat; at least one sensor for monitoring a parameter indicative of heat within a core of the mat, the sensor providing a first trigger signal when the parameter reaches a first predetermined reference level and a second trigger signal when the parameter reaches a second predetermined reference level; and a control system connected to receive the first and second trigger signals. The control system is configured to cause the press to apply vibratory forces to the face surface in response to the first trigger signal and to cause the press to apply a non-vibratory force to the face surface in response to the second trigger signal.

Yet another aspect of the invention provides a system for pressing a mat of material having a thermosetting adhesive having a temperature range at which the adhesive cures. The mat has a face surface and typically has an initial temperature below the temperature range at which the adhesive cures. The system comprises a press for accepting the mat; a temperature sensor for sensing the temperature of the core of the mat; and a control system for accepting a first signal from the temperature sensor and, in response to the signal, causing the press to apply vibratory forces to the mat normal to the face surface when the core of the mat is below a predetermined temperature. The control system is also programmed to cause the press to apply a non-vibratory force to the mat normal to the face surface when the core of the mat is above the predetermined temperature.

Another aspect of the invention provides a system for pressing a mat of material having a thermosetting adhesive having a temperature range at which the adhesive cures. The mat has a face surface and typically has an initial temperature below the temperature range at which the adhesive cures. The system comprises a press for accepting the mat; a vapour pressure sensor for sensing a vapour pressure within a core of the mat; and a control system for accepting a first signal from the vapour pressure sensor and, in response to the first signal, causing the press to apply vibratory forces to the mat normal to the face surface when the core of the mat is below a predetermined vapour pressure. The control system is also programmed to cause the press to apply a non-vibratory force to the mat normal to the face surface when the core of the mat is above the predetermined vapour pressure.

Further features and applications of specific embodiments of the invention are described below.

BRIEF DESCRIPTION OF DRAWINGS

In the accompanying drawings which illustrate specific embodiments of the invention, but which should not be construed as restricting the spirit or scope of the invention in any way.

DESCRIPTION

Figure 1:
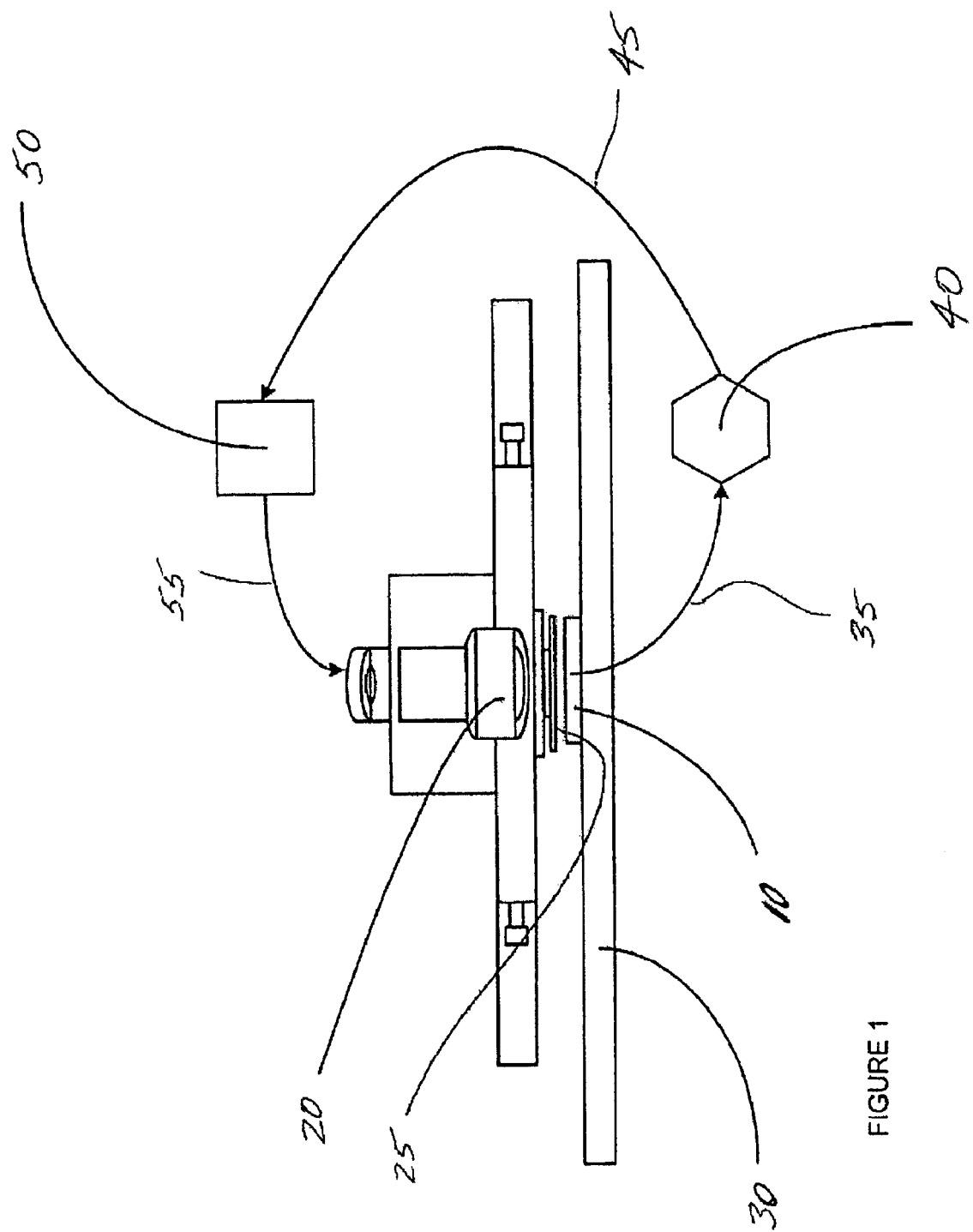
FIG. 1 is schematic view of a hot pressing system in accordance with a particular embodiment of the invention.

Throughout the following description, specific details are set forth in order to provide a more thorough understanding of the invention. However, the invention may be practised without these particulars. In other instances, well known elements have not been shown or described in detail to avoid unnecessarily obscuring the invention. Accordingly, the specification and drawings are to be regarded in an illustrative, rather than a restrictive, sense.

FIG. 1 is a schematic depiction of a hot pressing system according to a particular embodiment of the invention. Referring to FIG. 1, the hot pressing system of the present invention comprises a press 20 for pressing a mat of material 10. In a preferred embodiment of the invention, the material in mat 10 is a lignocellulosic material such as wood fibres used to produce MDF, in combination with a thermosetting adhesive such as a UF resin, although the invention contemplates use with any particulate materials which require hot pressing and which do not conduct heat well.

In the illustrated embodiment of FIG. 1, press 20 may be provided in an MDF mill. Such a mill typically has a conveyor system 30 for conveying mat 10 to the pressing face 25 of press 20. This system may be provided in a continuous press, a multi-daylight press, or some other type of press known in the art. Press 20 is controlled by control system 50. When mat 10 is in place within press 20, press 20 is instructed by control system 50 to press mat 10 by forcing pressing face 25 against the top surface of mat 10 for a predetermined period of time. The time required for pressing mat 10 in known systems is widely variable, and may depend upon the type of cellulosic material in mat 10, the type of adhesive therein, the moisture content of the mat, the ambient temperature of the system, the initial temperature within mat 10 and/or the vapour pressure within mat 10.

The system of the present invention comprises at least one sensor 40 for measuring one or more parameters indicative of the heat within the core of mat 10. Such parameter(s) may generally comprise any detectable indicator of heat energy with the core of mat 10 or any combination of such indicators. In preferred embodiments, the parameter comprises the core temperature of mat 10, the vapour pressure within the core of mat 10, ultrasonic emission from mat 10 and/or radiation emitted from mat 10. The particular nature of sensor 40 is not in and of itself important to the operation of the invention, and variations of such sensors may be or become known to those skilled in the art. Sensor 40 is able to sense one or more parameters indicative of the heat within mat 10 while mat 10 is being pressed by press 20.

In operation, following the preparation of mat 10 (ie. the addition of a thermosetting adhesive to some cellulosic material), mat 10 is introduced to press 20 by conveyor 30. Press 20 preferably comprises a means for providing heat to mat 10. Heat may be provided to mat 10 using any of a variety of heating apparatus and techniques. For example, mat 10 may be heated on its bottom surface by conduction of heat from conveyor 30, and may be further heated by conduction of heat from pressing face 25. Mat 10 may also be heated in some other manner, such as by the introduction of steam and/or radiation (not shown). In any case, heat may be provided to mat 10 when in place in press 20. In a typical pressing system, mat 10 is pressed by pressing press face 25 against one surface of mat 10 with some original pressing force. Preferably, the original pressing force is applied in a direction normal to the top surface of the mat.

For ease of explanation, it is assumed for the purpose of describing the system of the present invention that sensor 40 is a temperature sensor and that temperature is the parameter indicative of the heat within mat 10. As discussed above, temperature sensor 40 may generally comprise any sensor(s) for measuring one or more parameters indicative of the heat with mat 10. Those skilled in the art will appreciate that pressing systems incorporating different sensors will function in a similar manner to the pressing systems described herein.

In a particular embodiment of the present system, while heat is supplied to mat 10, sensor 40 monitors the temperature of the core of mat 10 via signal 35 and provides information about the temperature of the core of mat 10 to control system 50 via signal 45. Control system 50 is programmed or otherwise configured to monitor signal 45 from sensor 40. In response to signal 45 from sensor 40 indicating that the temperature of the core of mat 10 has reached a first predetermined reference level, control system 50 provides signal 55 to press 20, causing press face 25 to provide, alternatingly, a first force and a second, lesser force to mat 10 in a vibratory fashion. In some embodiments, control system 50 causes pressing face 25 to move in a reciprocating manner so as to provide a vibratory force normal to a face surface of mat 10. In the illustrated embodiment of FIG. 1, control system 50 causes pressing face 25 to be lowered and raised, providing a vibratory force normal to the top face of mat 10. The second force provided by press face 25 need not be zero; rather it needs only be less than the first force. The first or second alternating force may be the same as the original pressing force, or may both be different.

These vibratory forces are provided to mat 10 until signal 45 from sensor 40 indicates that the temperature of the core of mat 10 has reached a second predetermined reference level. In preferred embodiments, the temperature of the core of mat 10 at the second predetermined reference level is below the curing temperature range of the adhesive in mat 10. When control system 50 determines that signal 45 from sensor 40 indicates that the temperature of the core of mat 10 has reached the second predetermined reference level, control system 50 provides signal 55 to press 20, causing press face 25 to press the face surface of mat 10 with a constant, non-vibrating force. In preferred embodiments, this non-vibratory force is applied by press face 25 in a direction that is normal to the face surface of mat 10.

In alternative embodiments of the invention, it is not necessary to have a precise predetermined temperature at which vibratory forces are applied to mat 10. For example, vibratory forces may automatically be applied to mat 10 when mat 10 is received in press 20 or vibratory forces may be applied to mat 10 after mat 10 has been received in press 20 for a period of time. Control system 50 may monitor signal 45 from sensor 40. When signal 45 indicates that the temperature of the core of mat 10 is below a predetermined reference level, then control system 50 may cause vibratory forces to be applied to mat 10. When signal 45 indicates that the temperature of the core of mat 10 is above the predetermined reference level, then control system 50 may cause a non-vibratory force to be applied to mat 10.

In general, the vibratory forces may be applied at any time when the temperature of the core of mat 10 is below the predetermined reference level and the non-vibratory force may be applied at any time when the temperature of the core of mat 10 is above the predetermined reference level. Preferably, however, the predetermined temperature is at or below the curing temperature range of the adhesive used in mat 10.

Essentially, the vibrating forces applied to mat 10 are thought to serve to assist the transfer of heat from the surfaces of the mat to the core by way of convection. The inventors have determined that vibrations falling in the frequency range of 0.2–2.0 Hz are suitably employed in the invention. The inventors have also determined that for a typical MDF mat, the press face can be reciprocatively moved over a distance in a range of 0.2–3 mm to provide the vibratory forces. In experimental testing, the system has been found to reduce pressing time in the manufacture of MDF by 12%, with no degradation in the quality of the finished MDF panel.

As will be apparent to those skilled in the art in the light of the foregoing disclosure, many alterations and modifications are possible in the practice of this invention without departing from the spirit or scope thereof. For example:

It is convenient but not essential that temperature of the core of mat 10 be monitored. As discussed above, sensor 40 may also sense other parameter(s) of mat 10 which are indicative of the amount of heat within the core of mat 10, such as vapour pressure, ultrasonic emission and/or radiation emission for example. In such embodiments, control system 50 may use vapour pressure, ultrasonic emission and/or radiation emission reference level(s) to control the application of vibratory and/or non-vibratory forces to mat 10.

In other alternative embodiments, sensor 40 may comprise circuitry and/or logic which allows it to determine when the measured parameter has reached its predetermined reference level(s). In such embodiments, control system 50 need not constantly monitor sensor 40 and may be free to perform other tasks. Sensor 40 may only provide signal 45 to control system 50 when the measured parameter has reached its first predetermined reference level and/or when the measured parameter has reached its second predetermined reference level. In such embodiments, the signal 45 from sensor 40 comprises trigger signals, which trigger control system 50 to apply vibrating or non-vibratory forces to mat 10.

Those skilled in the art will appreciate that control system 50 may be implemented by a wide variety of apparatus. By way of non-limiting example, control system 50 may comprise a microprocessor, a programmable logic circuit, a personal computer, a digital signal processor, an off-the-shelf programmable controller or the like. Control system 50 may also comprise any combination of these types of apparatus.

As discussed above, it is preferable that vibratory forces are applied only when the temperature of the core of the mat is below the curing temperature range of the adhesive. In preferred embodiments, the onset (i.e. the low end) of the curing temperature range is approximately 80–85° C. In other embodiments, however, the onset of the curing temperature range may be as low as approximately 60° C. or as high as approximately 110° C.

Accordingly, the scope of the invention is to be construed in accordance with the substance defined by the following claims.

What is claimed is:

1. A system for heating and pressing a mat of material having at least one face surface and comprising a thermosetting adhesive, the system comprising:
   a press for accepting the mat;
   at least one sensor for sensing a parameter indicative of heat within a core of the mat; and
   a control system connected to the sensor to accept a signal therefrom and configured to cause the press to apply vibratory forces to the face surface when the signal indicates that the parameter is below a predetermined reference level and to cause the press to apply a non-vibratory force to the face surface when the parameter is above the predetermined reference level.

2. A system according to claim 1 wherein the parameter comprises one or more of: a temperature of the core of the mat and a vapour pressure within the core of the mat.

3. A system according to claim 1 wherein the parameter comprises one or more of: ultrasonic emission from the mat and radiation emission from the mat.

4. A system according to claim 2 wherein the press comprises a pressing face for applying the vibratory and non-vibratory forces to the mat.

5. A system according to claim 4 wherein the pressing face provides heat to the mat by conduction of heat from the pressing face.

6. A system according to claim 2 wherein the press comprises a conveyor for transporting the mat and for providing heat to the mat by conduction of heat from the conveyor.

7. A system according to claim 2 wherein the press comprises a source of steam for providing heat to the mat.

8. A system according to claim 2 wherein the vibratory forces have a frequency in a range between 0.2–2.0 Hz.

9. A system according to claim 4 wherein the vibratory forces are applied by reciprocatably moving the pressing face over a distance in a range between 0.2–3.0 mm.

10. A system according to claim 1 wherein the predetermined reference level corresponds with a temperature that is below a curing temperature range of the adhesive.

11. A system for heating and pressing a mat of material having at least one face surface and comprising a thermosetting adhesive, the system comprising:
    a press for accepting the mat;
    at least one sensor for sensing a parameter indicative of heat within a core of the mat; and
    a control system connected to the sensor to accept a signal therefrom and configured to cause the press to apply vibratory forces to the face surface when the signal indicates that the parameter has reached a first predetermined reference level and to cause the press to apply a non-vibratory force to the face surface when the parameter has reached a second predetermined reference level.

12. A system according to claim 11 wherein the parameter comprises one or more of: a temperature of the core of the mat and a vapour pressure within the core of the mat.

13. A system according to claim 11 wherein the parameter comprises one or more of: ultrasonic emission from the mat and radiation emission from the mat.

14. A system according to claim 12 wherein the press comprises a pressing face for applying the vibratory and non-vibratory forces to the mat.

15. A system according to claim 14 wherein the pressing face provides heat to the mat by conduction of heat from the pressing face.

16. A system according to claim 12 wherein the press comprises a conveyor for transporting the mat and for providing heat to the mat by conduction of heat from the conveyor.

17. A system according to claim 12 wherein the press comprises a source of steam for providing heat to the mat.

18. A system according to claim 12 wherein the vibratory forces have a frequency in a range of 0.2–2.0 Hz.

19. A system according to claim 14 wherein the vibratory forces are applied by reciprocatively moving the pressing face over a distance in a range between 0.2–3.0 mm.

20. A system according to claim 11 wherein the second predetermined reference level corresponds with a temperature that is below a curing temperature range of the adhesive.

21. A system for pressing a mat of material having at least one face surface and comprising a thermosetting adhesive, the system comprising:
    a press for accepting the mat;
    at least one temperature sensor for sensing a temperature of a core of the mat; and
    a control system for accepting a signal from the temperature sensor and, in response to the signal, causing the press to apply vibratory forces to the mat normal to the face surface when the temperature of the core of the mat is below a predetermined temperature, and programmed to cause the press to apply a non-vibratory force to the mat normal to the face surface when the temperature of the core of the mat is above the predetermined temperature.

22. A system according to claim 21 wherein the predetermined temperature is below a curing temperature range of the adhesive.

23. A system for pressing a mat of material having at least one face surface and comprising a thermosetting adhesive, the system comprising:
    a press for accepting the mat;
    at least one temperature sensor for sensing a temperature within a core of the mat; at least one vapour pressure sensor for sensing a vapour pressure within a core of the mat; and
    a control system for accepting signals from the temperature sensor and the vapour pressure sensor, the control system configured to cause the press to apply vibratory forces to the face surface when the signal from the vapour pressure sensor indicates that the vapour pressure within the core of the mat has reached a predetermined vapour pressure level and to cause the press to apply a non-vibratory force to the face surface when the signal from the temperature sensor indicates that the temperature of the core of the mat has reached a predetermined temperature level.

24. A system according to claim 23 wherein the predetermined temperature level is below a curing temperature range of the adhesive.

25. A system for pressing a mat of material having at least one face surface and comprising a thermosetting adhesive, the system comprising:
- a press for accepting the mat;
- at least one sensor for monitoring a parameter indicative of heat within a core of the mat, the sensor providing a first trigger signal when the parameter reaches a first predetermined reference level and a second trigger signal when the parameter reaches a second predetermined reference level; and
- a control system connected to receive the first and second trigger signals, the control system configured to cause the press to apply vibratory forces to the face surface in response to the first trigger signal and to cause the press to apply a non-vibratory force to the face surface in response to the second trigger signal.

* * * * *